Figure 10:
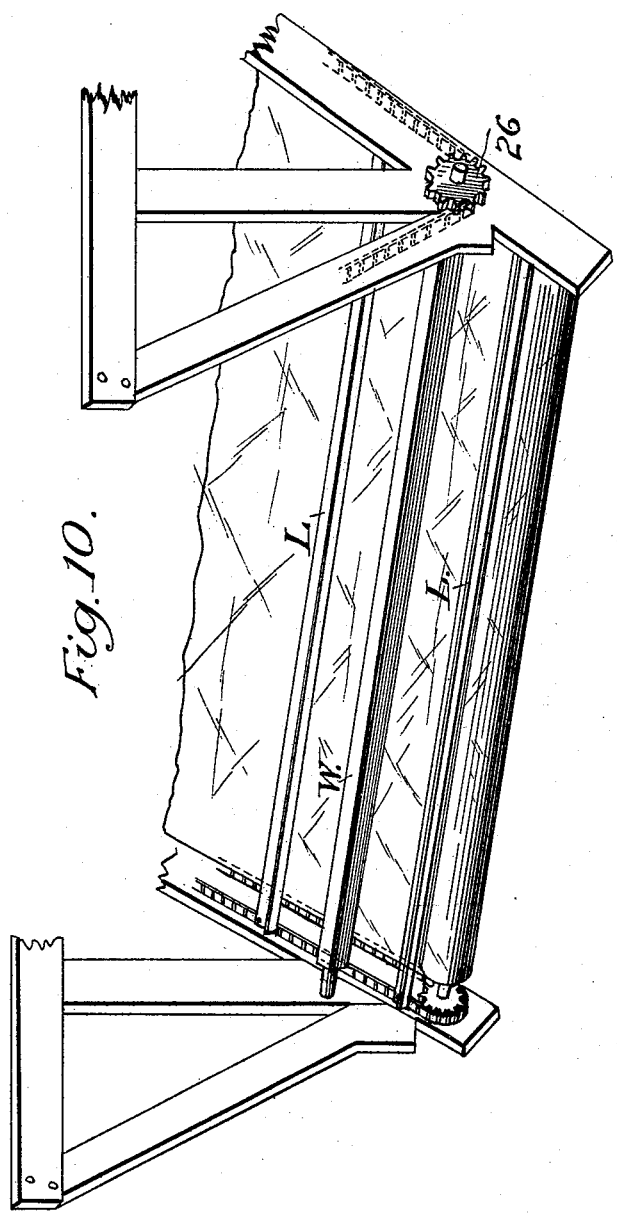

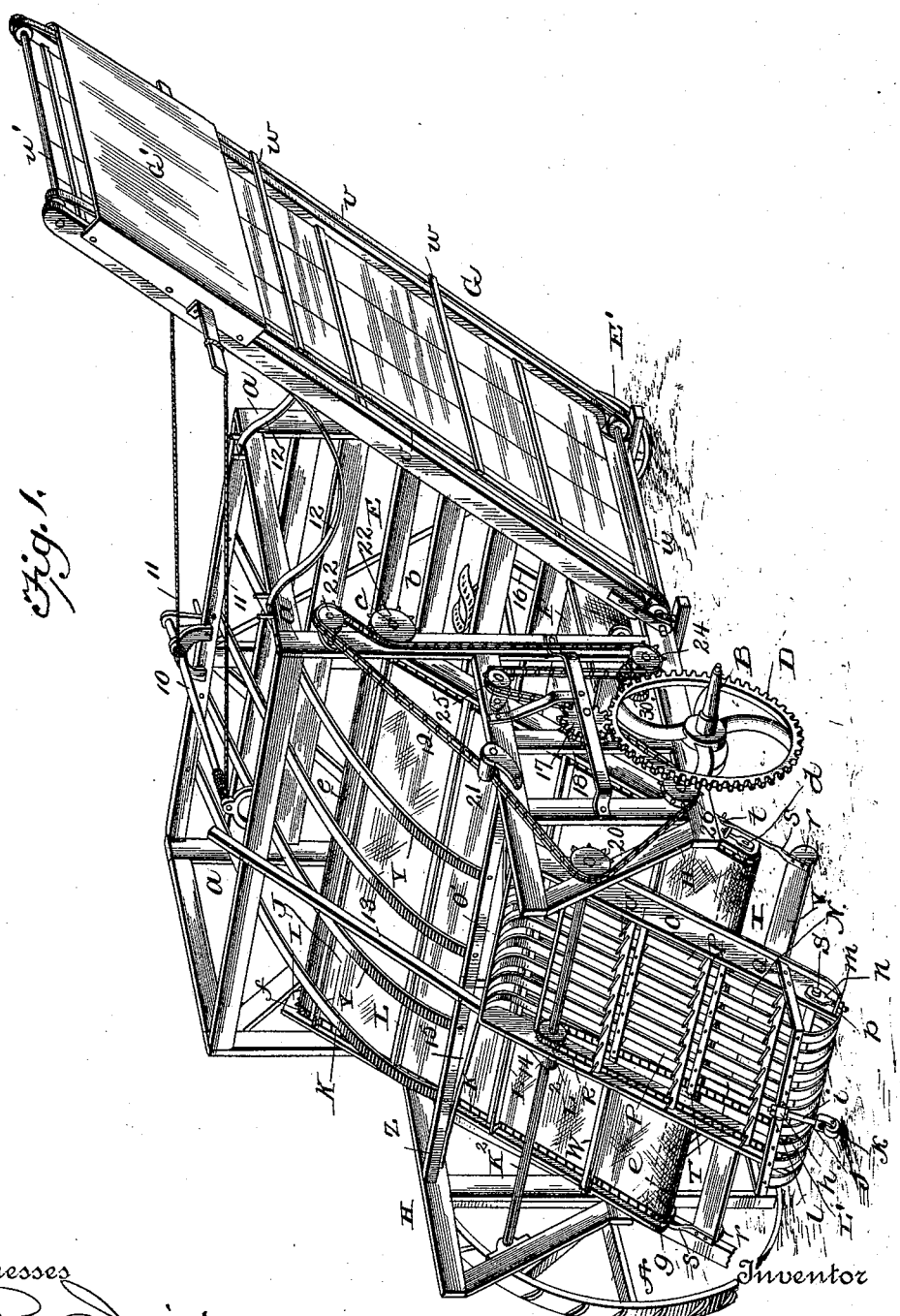

(No Model.) 4 Sheets—Sheet 2.
J. W. HARMON.
COMBINED HAY RAKE AND LOADER.
No. 483,917. Patented Oct. 4, 1892.
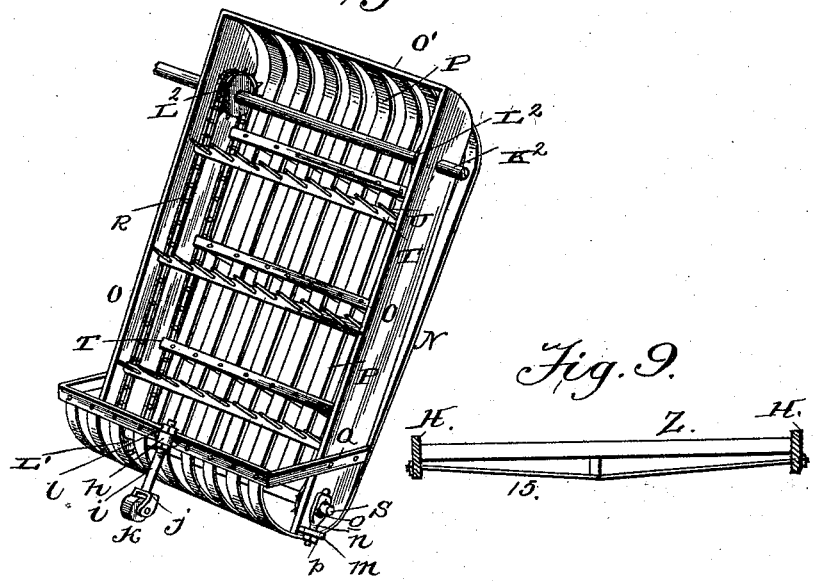
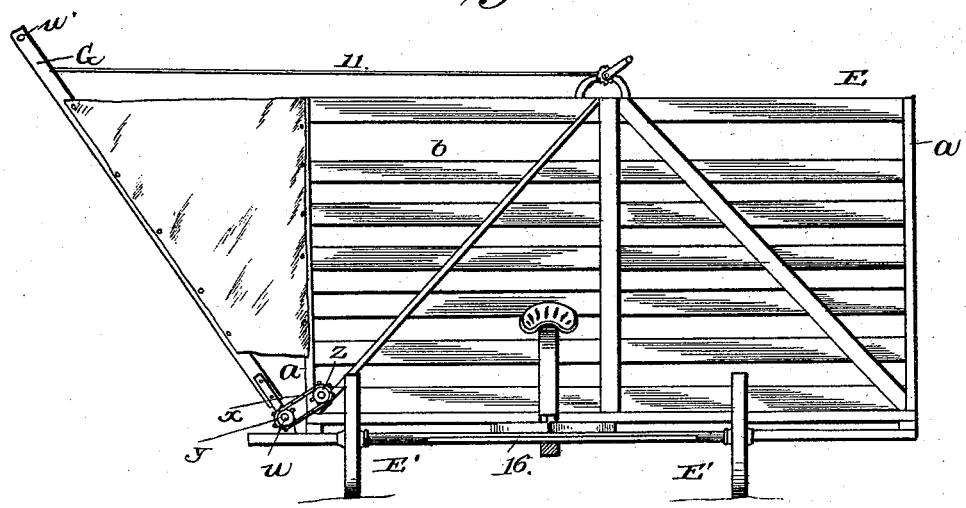
Witnesses
J. Ph. Dmine
Thomas Rout Jr
Inventor
John W. Harmon,
By his Attorneys
A. H. Evans and Co.

(No Model.) 4 Sheets—Sheet 3.
J. W. HARMON.
COMBINED HAY RAKE AND LOADER.
No. 483,917. Patented Oct. 4, 1892.
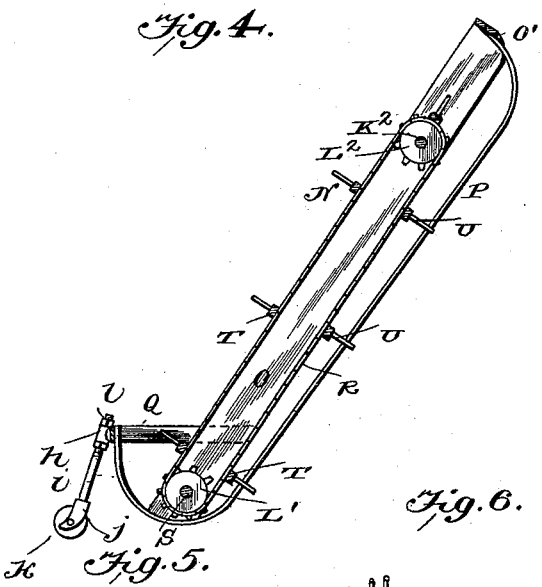
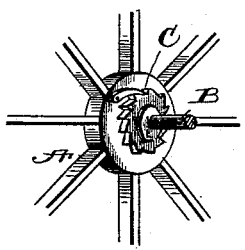
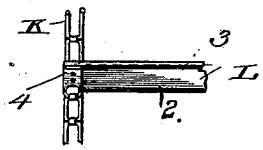
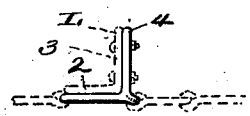
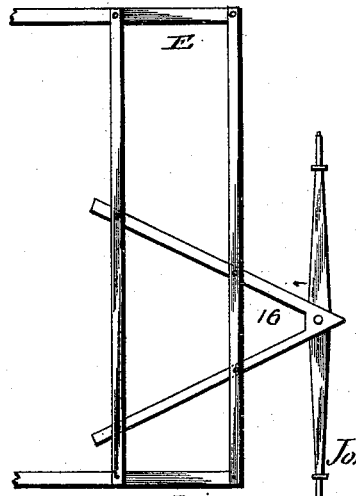
Witnesses
Inventor
John W. Harmon
By his Attorneys (No Model.) 4 Sheets—Sheet 4.

J. W. HARMON.
COMBINED HAY RAKE AND LOADER.

No. 483,917. Patented Oct. 4, 1892.

WITNESSES
Thomas Rout Jr.
Chapman J Fowler

INVENTOR
John W. Harmon
by A. H. Evans & Co. Attorneys

UNITED STATES PATENT OFFICE.

JOHN WILLIAM HARMON, OF CROMWELL, IOWA.

COMBINED HAY RAKE AND LOADER.

SPECIFICATION forming part of Letters Patent No. 483,917, dated October 4, 1892.

Application filed January 18, 1892. Serial No. 418,522. (No model.)

*To all whom it may concern:*

Be it known that I, JOHN WILLIAM HARMON, a citizen of the United States, residing at Cromwell, in the county of Union and State of Iowa, have invented certain new and useful Improvements in a Combined Hay Rake and Loader, as set forth in the accompanying drawings, forming part of this specification, in which—

Figure 1 is a perspective view of a combined hay rake and loader embodying my invention, showing one of the rakes and one of the main wheels removed. Fig. 2 is an enlarged detail, in perspective, of the removed rake of Fig. 1. Fig. 3 is a side view of the wagon forming part of the machine, showing its elevator and draft appliances. Fig. 4 is a sectional view of one of the rakes. Figs. 5, 6, 7, and 8 are enlarged details to be hereinafter referred to. Fig. 9 is a detail of the truss-beam. Fig. 10 is a detail showing a portion of the elevator and its adjuncts, and also the bar or beater W.

My invention relates to that class of machines known as "combined hay rakes and loaders;" and it consists of the constructions and combinations of devices which I shall hereinafter fully describe and claim.

To enable others skilled in the art to which my invention appertains to make and use the same, I will now describe its construction and indicate the manner in which the same is carried out.

In the drawings, A represents the main traction-wheels, and B is the main axle, the said wheels having the inner faces of their hubs provided with the usual pawl-and-ratchet mechanism C, as shown in Fig. 5. The axle B has secured to it a large gear or master wheel D, through the medium of which and suitable sprocket-wheels and chain connections the various parts of the machine are operated in the manner and for the purposes hereinafter stated.

At the front of the machine and extending transversely across its full width, or in a plane parallel with the main axle, is an open frame or crib E, mounted upon supporting-wheels E', and consisting of vertical corner-posts $a$ and slatted sides $b$, said frame or crib having one end closed and its opposite or elevator end open in the manner common to this class of machines, while the floor of the frame or crib E is closed by a traveling carrier or apron F, which delivers the hay to the elevator frame or stacker G, which discharges upon the stack at one side of the machine.

Projecting rearwardly from the frame or crib E is a supplemental frame H of suitable form and construction, and to this frame and the frame of the crib E the elevator-frame I is securely fastened and provided at its opposite ends with bearings for the shafts $c$ and $d$ of the rolls $e$, around which pass the elevator J, which latter is made of canvas or other material usually employed in the construction of aprons for this and similar classes of machines. The ends of the shafts $c$ and $d$, just inside of the sides of the frame I, are provided with sprocket-wheels $f$ and $g$, and around these wheels the chains K pass, said chains having secured to them the angular metal bars L, which, after having their ends secured to the chains, extend across the apron or elevator J. The bars L have their horizontal flange 2 secured to the chains by means of angle-iron plates 4 and their vertical flanges project upwardly, as shown.

Journaled between the sides of the elevator-frame is a bar W, preferably square in cross-section, upon one end of which the pinion 26 is mounted and driven by the chain 19, whereby when the machine is in operation this bar is rotated and forms a beater, and in practice will be driven faster than the elevator to prevent the hay bunching on the apron. It will also press the hay against the apron and cause it to be carried up the latter in a more uniform manner.

Journaled in the rear portions of the supplemental frame H and extending transversely across the full width of the machine is a shaft $K^2$, having secured to its ends and middle portions the sprocket-wheels $L^2$, and having secured to one of its ends a sprocket-wheel 20, to which power is applied to operate the rakes N. These rakes or swath-gatherers are arranged side by side and their frames O receive the shaft $K^2$, upon which they are hung, so that they may have a pivotal movement to enable their lower ends to rise and fall, and thereby adjust themselves to any irregularity in the ground. The sides of the frames O are joined by transverse strips or plates O' and the floor or bottom of said frame is made of a series of parallel strips P, running lengthwise of the frame and separated from each other to form the guides or for the rake-teeth to be hereinafter specified, said strips being curved at both ends and the extremities of the lower ends being carried upward a short distance above the sides of the rake-frame and securely fastened to a yoke Q, in the middle portion of which is formed or provided a bearing $h$ for the stem $i$ of the frame $j$, in which a caster-wheel $k$ is mounted, said frame $j$ having its stem threaded and engaged by nuts $l$, whereby the caster-wheel may be adjusted to different heights.

The rakes or swath-gatherers are made separate, so that either one may be readily removed without disturbing the other, and their construction is the same, each having its own drive-chains and complementary parts. The endless chains R of the rakes pass around the sprocket-wheels $L^2$ on the shaft $K^2$, and also around other sprocket-wheels L' on the shaft S, journaled in the lower portion of the rake-frame, and to these chains are secured the ends of metal bars or heads T, which are adapted to travel over the face of the slotted bottom of the rake-frame and have rigidly secured to them the rake-teeth U. When the rakes are in operation, the upper rake-heads move downward with their teeth projecting upwardly, as shown in Fig. 1, from which position they are turned by the chains passing over the lower shaft S. When taking the downward movement, the rake-heads enter the space formed by the yoke Q and lower upwardly-curved ends of the strips P, and as the chains pass around the shaft S the rake-teeth project through the spaces or guides formed by the spaced or separated strips P and retain this position during the period the rake-heads are taking the upward course. When the rake-heads arrive at the upper curved ends of the strips P, the teeth are caused to withdraw from the spaces or guides between the strips, thereby clearing the teeth of any hay or material which has clung to them.

In order that the chains may be kept at the proper tension and to take up any slack in them, I secure to the lower ends of the sides of the rake-frame O suitable guides $m$, in which are fitted the threaded bolts $n$, having slotted heads $o$, through which the ends of the shafts S pass. If the chains R are found to be slack, the operator screws up the nuts $p$ on the bolts, and thereby adjusts the shaft S until the desired tension has been given the chains.

As before stated, the rakes are separate and independent of each other, and being suspended near their upper ends upon the shaft $K^2$ their lower or curved ends are permitted to rise and fall independently of each other and to yield to any irregularity in the surface of the ground. At the same time should the rake-teeth meet an obstruction too heavy for them to move they will turn back until the obstruction is passed and then spring forward again. The rake-heads being secured to the lower members of the chains when moving upward with the load, the striking of an obstruction will cause the chains to give at the affected rake-head and at the same time cause an increased tension upon the rakes preceding the one meeting the obstruction.

Under and in front of the rake-frames and between them and the lower ends of the frame of the elevator J is a board V, lying against the ground and having end shoes $r$. This board has spring-arms $s$ secured to it and projecting in front and pivotally secured by an eye $t$, engaging the hooked end of the arms. As the rake-teeth meet the hay, the latter is inclined to bunch or roll up; but as the teeth move the charge of hay forward it is met by the board V and its rolling action checked, and it is moved over the board until it is engaged by the elevator J. As soon as the hay starts up the elevator the beater catches the hay, drawing it forward and pressing it down upon the elevator-apron. The hay is thus kept in motion without danger of its bunching, and it is moved up to the top of the elevator and discharged into the crib E and, falling upon the crosswise elevator in the bottom of the latter, is finally moved to the side elevator G and discharged upon the load or stack.

In order that no hay may be blown off the elevator when they reach the upper end of the latter, I employ the curved metal guard-strips Y, which are secured to a cross-beam Z, uniting the sides of the supplemental frames H, and thence extend over the top end of the elevator J and top of the crib and are fastened to the latter.

The side elevator G, which receives the hay from the crosswise apron or carrier F of the crib and discharges it to one side upon the load or stack, has the lower end of its frame pivotally secured to a rod or shaft $u$, mounted on the frame of the crib, while in the upper end of the frame of the elevator G another shaft $u'$ is mounted. Around the shafts $u$ and $u'$ pass the endless bands or chains $v$ of the elevator, and to these bands or chains the usual slats $w$ are secured, said elevator being driven by power received from the crosswise elevator of the crib through the medium of a belt $x$ and gears $y$ and $z$, or in any other suitable manner.

To the upper portion of the side elevator G a broad metal guard G' is secured to prevent the slats of the elevator coming against the load or stack, and thereby interfering with their movement.

Across the top of the crib is journaled a drum or shaft 10, from which lead ropes or connections 11, whose opposite ends are secured to the frame of the elevator G, whereby the inclination of the latter may be adjusted with relation to the load or point of discharge, and secured at one end to the frame of the crib and with their opposite ends resting lightly against the slats of the side elevator G are the curved and elastic guards 12, whose function is to prevent the hay being blown off the upper end of side elevator.

In order that the shaft $k^2$, upon which the rakes are hung, may be properly braced to withstand the strain upon it, I employ a supporting-beam 13, having a box or bearing 14 at its lower end for the center of said shaft, while the beam 13 is itself braced by being secured to and resting upon the cross-beam Z, which unites the side portions of the supplemental frame H, which latter beam Z is also strengthened by a truss rod or beam 15, as shown in Figs. 1 and 9.

The frame of the crib is connected with a V-shaped frame 16, to which well-known draft appliances are secured in any suitable manner.

Power to operate the several features named is derived from the master-wheel or large gear D, secured to one of the main supporting-wheels. This master-wheel meshes with and drives a smaller idle-gear 17, to one side of which is a sprocket-wheel 18 for engagement with a drive-chain 19, which passes around a sprocket-wheel 20 on the shaft $K^2$ and entends forward under any well-known form of tightener 21 to a small idle-gear 22 on the frame of the crib and thence around a large sprocket-wheel 22 on the upper shaft $c$ of the elevator J. From this point the chain passes downward to a sprocket-wheel 24, which, through the medium of beveled gears 30, operates the forward shaft of the crosswise carrier F and thence extends upward to an idle-gear 25 and thence rearward under the large sprocket 18 to the smaller gear 26 on the beater W and, finally, upward to the gear 20, on the shaft upon which the rakes are hung.

Having thus described my invention, what I claim as new, and desire to secure by Letters Patent, is—

1. In a hay rake and loader, the combination, with a wheeled frame having an elevator, a crib into which the same discharges, and means connecting with the main supporting-wheels for driving the elevator, of a shaft in rear of the elevator, independent rake-frames placed side by side and having their upper portions pivotally hung upon said shaft, adjustable casters at the lower ends of the rake-frames and resting upon the ground, shafts in the lower part of the rake-frames, sprocket-wheels on the shaft upon which the rake-frames are hung, endless chains passing around said sprocket-wheels, rake-heads secured to said chains and provided with rake-teeth and adapted to pass through the slatted bottom of the frames when elevating the hay, and means for driving the chains, substantially as herein described.

2. A hay rake and loader comprising a wheeled frame having an elevator, a crib into which the same discharges, independent rake-frame pivotally hung in rear of the elevator having endless chains provided with rake heads and teeth, a yielding board in rear of the receiving end of the elevator and interposed between the same and the adjacent side of the rake-frames, and means for operating the rakes and elevator by power derived from the main supporting-wheels, substantially as herein described.

3. In a hay rake and loader, the wheeled main frame having a supplemental frame in its rear, an elevator mounted between the main and supplemental frames, a transverse shaft $K^2$, mounted in the supplemental frame and provided with sprocket-wheels $L^2$ near its ends and center, the rake-frames O, pivotally mounted at their upper ends on said shaft, an adjustable shaft S in the lower portion of said rake-frame, having sprocket-wheels at its ends, the spaced strips P, forming the bottoms of the rake-frames and having their opposite ends curved, endless chains passing around the sprocket-wheels on the shafts $K^2$ and S, the rake-heads having their ends secured to the chains, rake-teeth projecting from said heads and adapted to enter the spaces between said strips when carrying the hay upward, means for operating the chains and elevator, and a yielding board between the rakes and receiving end of the elevator for directing the hay onto the latter and prevent its bunching, substantially as herein described.

4. In a hay rake and loader having an elevator for carrying the hay to the point of discharge, the pivotally-suspended endless rakes in rear of the elevator with their lower ends resting upon the ground, and a directing-board hung from the lower end of the elevator-frame and having end shoes resting upon the ground, said board being interposed between the rake and receiving end of the elevator to prevent the hay rolling under the influence of the rakes and to direct it onto the elevator, substantially as herein described.

5. In a hay rake and loader having an elevator in front of the rake, a board loosely hung in rear of the receiving end of the elevator, adapted to restrain the rolling action of the hay and direct the hay without bunching onto the elevator, and means for operating the rakes and elevator, substantially as herein described.

6. In a hay rake and loader, the rakes, the elevator, and the interposed board V, in combination with endless chains having the bars L secured to them and the bar or beater extending over the face of the elevator and adapted to be run at a greater speed than the elevator, and means for operating the rakes, elevators, and beater.

7. In a hay rake and loader, the main and supplemental frames, the independent pivotally-secured rake-frames having adjustable casters at their lower ends resting upon the ground, the elevator J, the bars L, and the beater W, extending across the elevator, the board V, interposed between the rakes and elevator, the curved guards Y and 12 at the upper end of the elevator and crib, the crib E, into which the elevator discharges and provided with the crosswise carrier F, the side elevator G and means for adjusting the same, the guard G' on the under side of the upper portion of the side elevator, and means for adjusting the side elevator and driving the rakes, elevators, and beater, substantially as herein described.

8. In a hay rake and loader, the main frame with its elevator, the crib, and the adjustable side elevator, in combination with a supplemental frame H, the transverse shaft $K^2$, journaled therein, having sprocket-wheels at its end and center, the rake-frames pivotally suspended near their upper ends from said shafts, the transverse beam Z, the brace-beam 13, supported by the beam Z and having a bearing at its lower end for the center of the shaft, and the truss-rod below the beam Z, substantially as herein described.

JOHN WILLIAM HARMON.

Witnesses:
LURON A. WALSWORTH,
L. D. BLOSSER.